United States Patent Office 3,401,133
Patented Sept. 10, 1968

3,401,133
FILM-FORMING POLYURETHANE LATICES
Oscar M. Grace, Madison Heights, and James M. McClellan, Jr., Detroit, Mich., assignors to Wyandotte Chemicals Corporation, Wyandotte, Mich., a corporation of Michigan
No Drawing. Filed Aug. 24, 1965, Ser. No. 482,260
14 Claims. (Cl. 260—29.2)

The present invention relates to film-forming polyurethane latices and to a process for the preparation thereof. More particularly, this invention relates to film-forming polyurethane latices based on low equivalent weight polyalkylene ether polyols having a functionality greater than two.

Polyurethane latices obtained by chain extending, in an aqueous system, NCO-terminated prepolymers pre-prepared by the reaction of an organic diisocyanate and a hydroxyl-containing component are known in the art. Generally, these latices are either coagulated and molded into useful elastomeric products or they are used in the preparation of coated, bound or impregnated articles of manufacture. A most important application of polyurethane latices is in the preparation of coated articles such as fabrics, leather, synthetic leathers, synthetic fibers, foams, metals and wood. For this application, it is, of course, necessary that, upon casting, the polyurethane latices be film-forming. However, much difficulty has been encountered in the preparation of such polyurethane latices. Certain latices, upon casting and curing, are just not film-forming. Others, although they are film-forming, form films which crack upon drying and, thus, are obviously useless. Still others, although film-forming, do not form films of suitable mechanical strength properties for application in the coating industry.

Now, in accordance with this invention, film-forming polyurethane latices are obtained by chain extending an NCO-terminated prepolymer prepared by the reaction of an organic diisocyanate and a polyalkylene ether polyol having a functionality greater than two and an equivalent weight from 500 to 2500 with a mixture comprising a compound having one active hydrogen atom and a compound having at least two active hydrogen atoms. Films cast from the latices of this invention possess mechanical strength properties suitable for application in the coating industry. It has now been found that by employing the abovementioned mixture as chain extending agent film-forming polyurethane latices may be prepared based on polyalkylene ether polyols having a functionality greater than two and an equivalent weight in the range of 500 to 2500. As used herein, equivalent weight is the molecular weight of the polyol per hydroxyl group.

As mentioned above, the mixture of chain extending agents which is employed in this invention comprises a compound having one active hydrogen atom and a compound having at least two active hydrogen atoms. Examples of compounds having one active hydrogen atom include alcohols such as methyl alcohol, butyl alcohol, lauryl alcohol and benzoic alcohol, trichlorinated isopropanol and fluorinated alcohols; mercaptans such as butyl mercaptan and lauryl mercaptan; acids such as acetic acid, nonyl acid and lauric acid; alkylene oxide condensates of alkyl phenols such as the 1 to 50 mole adducts of ethylene oxide and octyl phenol, and secondary amines such as dibutylamine, methylethylamine and morpholine. The particular compound employed is not critical. All that is important is that the compound have one active hydrogen atom.

Examples of compounds having at least two active hydrogen atoms include water, primary and secondary diamines such as phenylene diamine, 1,4-cyclohexane-bis-(methylamine), ethylene diamine, N-(2-hydroxypropyl) ethylene diamine, N,N'-di(2-hydroxypropyl)ethylene diamine, piperazine, 2-methylpiperazine and dodecahydro-1,4,7,9b-tetraazaphenaline; triamines such as diethylene triamine and triisopropanolamine; amino acids such as glycine, alanine, lysine, phenylalanine and cystine; hydroxy acids such as hydroxyacetic, glycolic, hydroxybutyric, lactic and hydroxyvaleric acids; and polyols such as 1,4-butanediol, ethylene glycol, 1,4-cyclohexanedimethanol, hexane diol, trimethylolpropane, glycerol and alkylene oxide adducts or any of the above polyols. Mixtures of the above may also be employed. Compounds having two active hydrogen atoms such as 2-methylpiperazine are preferred.

The total amount of chain extending agent which is employed in the preparation of the latices of this invention is preferably about 1.0 equivalent for each isocyanate equivalent, of which 0.05 to about 0.5 equivalent per isocyanate equivalent will be a compound having one active hydrogen atom. Stated otherwise, the mixture of chain extending agents will comprise from 5% to 50% of equivalents derived from the compound containing one active hydrogen atom, based on the total equivalents present. Up to about 1.25 equivalents for each isocyanate equivalent may be employed. The chain extension step may frequently be assisted by agitation of the emulsion for some time after its initial inception. This is usually accomplished by means of a conventional paddle-type agitator at 30 r.p.m. to 90 r.p.m. Any other conventional stirring equipment such as a Cowles Dissolver, which aids in contacting the droplets with the chain extender, may also be employed.

Chain extension of the prepolymer may be effected in several dicerent ways. Generally, chain extension is accomplished by adding a mixture of chain extending agents to an emulsified prepolymer. The components which comprise the chain extending agents of this invention may be added to the emulsified prepolymer either separately or jointly. The components are preferably added in the form of an aqueous solution or dispersion thereof. However, they may be added alone or in the form of a solvent solution. It is also possible to add the compound having one active hydrogen atom to the hydroxyl-containing component during prepolymer preparation and then, after emulsifying the prepolymer, to add the compound containing at least two active hydrogen atoms. This procedure is generally employed when a compound having a hydroxyl group is used as the compound having one active hydrogen atom.

The polyalkylene ether polyols which are employed in the preparation of the polyurethane latices of this invention are those polyols having an equivalent weight from 500 to 2500, preferably from 500 to 1500, and which result from the reaction of an alkylene oxide and a compound having at least three active hydrogen atoms. Alkylene oxides which may be employed in the preparation of the polyalkylene ether polyols are those oxides which have at least three carbon atoms such as propylene oxide, butylene oxide, styrene oxide, epichlorohydrin, tetrahydrofuran and cyclohexene oxide. Mixtures of any of the above may also be used. In addition, the above oxides may be used in combination with ethylene oxide. The amount of ethylene oxide in the mixture may vary considerably, depending upon the particular higher alkylene oxide used in conjunction therewith. In no instance, however, will the amount of ethylene oxide be greater than 50% by weight, based on the total weight of the alkylene oxide mixture.

Compounds having at least three active hydrogen atoms which may be employed in the preparation of the polyalkylene ether polyols include aliphatic alcohols such as glycerol, trimethylolpropane, pentaerythritol, sorbitol and sucrose; organic acids such as aconitic, trimellitic and hemimellitic; inorganic acids such as the phosphoric acids; amines such as ethylene diamine, propylene diamine, diethylene triamine and triisopropanolamine; phenolic compounds such as pyrogallol, dihydroxybenzoic acid, hydroxyphthalic acids and inositol mercaptans such as 1,2,3-propane trithiol and amides such as benzene disulfonamide. Mixtures of any of the above compounds may also be employed. The particular compound which is employed is not critical since it constitutes only a small proportion of the weight of the polyol. All that is important is that the compound have at least three active hydrogen atoms.

The polyalkylene ether polyols are prepared by standard art procedures such as catalytic polymerization of the oxide and the compound having at least three active hydrogen atoms. An alkaline catalyst such as potassium hydroxide is often employed in this polymerization.

The polyalkylene ether polyols which are employed in this invention have an equivalent weight between 500 and 2500. At equivalent weights above 2500, it is not necessary to employ the particular chain extending mixture of this invention to obtain film-forming latices and at equivalent weight below 500, film-forming polyurethane latices are not obtained even with the use of the particular chain extending mixture of this invention. Thus, it becomes apparent that the essence of this invention resides in the finding that a particular mixture of chain extending agents provides for the preparation of film-forming polyurethane latices from NCO-terminated prepolymers based on polyalkylene ether polyols having a functionality greater than two and an equivalent weight of from 500 to 2500.

If it is desired to improve the tensile and tear strength of the polymers prepared from the latices of this invention, diols may be employed along with the polyols in the preparation of the latices. Any of the diols which are known in the art are suitable for this purpose, particularly polyalkylene ether diols and diols prepared from the condensation of alkylene oxides and Bisphenol A.

Organic diisocyanates which may be employed in the preparation of the polyurethane latices of this invention include aromatic, aliphatic, and cycloaliphatic diisocyanates and combinations thereof. Representative compounds include aromatic diisocyanates, such as 2,4-tolylene diisocyanate, mixtures thereof with 2,6-tolylene diisocyanate (usually about 80/20), 4,4'-methylene-bis(phenylisocyanate), m-phenylene diisocyanate, and polyarylene polyisocyanates (commonly known as PAPI). Aliphatic compounds such as tetramethylene diisocyanate and hexamethylene diisocyanate, and alicyclic compounds such as 1,4-cyclohexylene diisocyanates and 4,4'-methylene-bis(cyclohexylisocyanate) are also operable. Compounds such as 2,4-tolylene diisocyanate in which two isocyanate groups differ in reactivity are particularly desirable. The diisocyanates may contain other substituents, although those which are free from reactive groups other than the two isocyanate groups are ordinarily preferred. In the case of the aromatic compounds, the isocyanate groups may be attached either to the same or to different rings. Additional diisocyanates which may be employed, for example, include 3,3'-dimethyl-4,4'-biphenylene diisocyanate, 3,3'-dimethoxy-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate, and other diisocyanates in a blocked or semi-inactive form such as the bis-phenylcarbamates of tolylene diisocyanate, p,p'-diphenylmethane diisocyanate, p-phenylene diisocyanate, 1,5-naphthalene diisocyanate and 1,5-tetrahydronaphthalene diisocyanate.

As mentioned before, the latices of this invention are prepared by chain extending prepolymers prepared by the reaction of organic diisocyanates and certain polyalkylene ether polyols. The prepolymer is ordinarily prepared by heating a polyol and a diisocyanate with agitation at a temperature of from about 60° C. to about 110° C., preferably from about 70° C. to about 90° C. A catalyst may be employed in this reaction if desired. If a catalyst is employed, temperatures from about 0° C. to about 60° C. are satisfactory. The reactants are heated for a period sufficient to react all the hydroxyl groups, whereafter the prepolymer is allowed to stand and the free NCO content determined. Generally, total reaction time will be from about two hours to about four hours. However, if a catalyst is employed, a period of from about fifteen minutes to about one hour is sufficient.

The reaction is preferably carried out, but not necessarily, in the presence of a solvent. If the prepolymer is a fluid at processing temperatures, it is possible to carry out the reaction in the absence of a solvent. Convenient solvents are organic solvents having a boiling range above 90° C. when the reaction is to be carried out in open equipment. Lower boiling solvents may, of course, be used where the reaction is carried out in closed equipment to prevent boiling off the solvent at the temperatures of the reaction. The solvent, when used, may be added at the beginning, at an intermediate point, or at the end of the prepolymer stage, or after cooling of the formed prepolymer. The solvents to be used are preferably those in which the reactants are soluble. Ketones and esters may be used. The aliphatic hydrocarbon solvents such as the heptanes, octanes and nonanes, or mixtures of such hydrocarbons obtained from naturally occurring petroleum sources such as kerosene, or from synthetically prepared hydrocarbons, may sometimes be employed. Cycloaliphatic hydrocarbons such as methylcyclohexane and aromatic hydrocarbons such as toluene may likewise be used. Hydrocarbon solvents such as toluene and benzene are preferred. The amount of solvent used may be varied widely. From 25 parts to 400 parts of solvent per 100 parts of polyol have been found to be operable. The excess solvent, where large amounts are employed, may be separated partially or completely from the polymer prior to emulsification in the water solution; sometimes the excess solvent is useful and is allowed to remain during the mulsification stage.

The amounts of organic diisocyanate and polyalkylene ether polyol which are employed in the preparation of the prepolymers are such that the NCO/OH equivalent ratio is between 1.1:1 to 2.25:1, preferably 2:1. At ratios greater than 2.25:1, incompatible resins tend to form, while at ratios less than 1.1:1 gelling of the polymer tends to occur.

After the prepolymer is prepared, it is emulsified by combining it with an aqueous solution of a surfactant with vigorous agitation. Emulsification of the prepolymer may occur by adding an aqueous solution of a surfactant to the prepolymer, by adding the prepolymer to an aqueous solution of a surfactant, by initially adding a surfactant to the prepolymer reactants and then adding water after the prepolymer has been prepared or by adding a surfactant to an aqueous medium containing the prepolymer.

The amount of water to be employed in the formation of the emulsion is not critical. When too small an amount of water is employed, emulsions are obtained which are too thick to handle readily while, on the other hand, dispersions which are too dilute are uneconomical to handle due to their excessive volume.

Any emulsifying agent which will give oil-in-water emulsions is satisfactory for use in the present invention. Satisfactory types of emulsifying agents are the polyethylene glycol ethers of long chain alcohols, quaternary ammonium salts, the tertiary amine or alkylol amine salts of long chain alkyl acid sulphate esters, alkyl sulphonic acids or alkyl aryl sulphonic acids or salts thereof; and alkali metal salts of high molecular weight organic acids. Nonionic agents such as polyoxyethylene-polyoxypropylene glycols, are preferred. The pH can then be regulated to a neutral value, preferably not above seven, to minimize any tendency toward hydrolysis. Salts of the high molecular weight organic acids may be used as emulsifying agents. One method of incorporating such salts is to mix the acid, e.g. coconut oil, with the prepolymer mass and to have the requisite amount of alkali present in the aqueous bath, so as to form the emulsifier in situ. Although there is presumably some reaction between the acid and the free isocyanate groups in the prepolymer, this is not significant if the mixture is fairly promptly added to the aqueous bath. From 0.5% to 6% of the emulsifying agent, based on the weight of the prepolymer employed, will usually be found sufficient to produce stable emulsions. When a fatty acid soap is used as the emulsifying agent, the soap must not be destroyed by acidic substances. The pH must, therefore, be maintained at least as high as that of an aqueous solution of the soap if stable latices are to be produced. For most fatty acid soaps, the pH should be at least nine, and for this reason soaps are not preferred. The small amount of carbon dioxide which may be formed by the chain extension of the isocyanate groups with water is acidic and uses up free alkali in the latex, so that an excess of alkali may be necessary to compensate for this. Preferably no alkali is added to the reaction, since some usually remains and causes deterioration of the polymer at elevated temperatures.

The following examples serve to illustrate the invention. All parts are by weight unless otherwise specified.

EXAMPLES I–XII

Numerous latices were prepared by the general procedure which is given below. The details of each preparation and certain physical properties of the film cast, if any, from the latices are given in Tables 1–3.

(A) Prepolymer preparation

A polyalkylene ether polyol was charged to a reaction vessel along with toluene and tolylene diisocyanate. The charge was stirred for about three hours at 80° C. to 90° C. and, after cooling, the free NCO content was determined. Additional toluene was then added to the reaction vessel to aid in the chain extension step which followed.

(B) Chain extension

To 840 parts of the cooled prepolymer solution consisting of 600 parts of prepolymer and 240 parts of toluene was added eighteen parts of a surface active agent consisting of dihydric polyoxyethylene polyoxypropylene having a molecular weight of about 16,000, a polyoxyethylene content of about 80% by weight and a molecular weight of the polyoxypropylene base of about 3250 dissolved in 420 parts of water. The aqueous surfactant solution was cooled prior to its addition to the prepolymer solution and the addition occurred with good agitatin in a "dispersator" mixer. The emulsion which was formed by the addition of the surfactant was passed through a homogenizer and, while stirring, a mixture of chain-extending agents dissolved in cold water was added to form a stable chain-extended latex. After aging the latex three days, a film was cast on a glass plate and air dried overnight at 25° C., followed by fusing for ten minutes at 150° C. in an air circulating oven. The film, if formed, was stripped from the plate and its physical properties were measured.

TABLE 1.—747 MOL. WT. (249 EQUIVALENT WT.) POLYOL PREPARED FROM PROPYLENE OXIDE AND TRIMETHYLOLPROPANE

| Example | NCO/OH ratio | Chain extender | | Film properties |
|---|---|---|---|---|
| | | A. Equiv. | B. Equiv. | |
| I | 2/1 | | 2-methylpiperazine, 3 | Not film-forming. |
| II | 2/1 | Morpholine, 1 | 2-methylpiperazine, 2 | Do. |
| III | 2/1 | Morpholine, 1 | Piperazine, 2 | Do. |
| IV | 2/1 | Phenyl isocyanate, 1 | 2-methylpiperazine, 2 | Do. |

TABLE 2.—1,540 MOL. WT. (513 EQUIVALENT WT.) POLYOL PREPARED FROM PROPYLENE OXIDE AND TRIMETHYLOLPROPANE

| Example | NCO/OH ratio | Chain extender | | Film properties | | |
|---|---|---|---|---|---|---|
| | | A. Equiv. | B. Equiv. | Modulus, 100% | Elongation, percent | Wt. percent perchloroethylene swell |
| V | 2/1 | | 2-methylpiperazine, 3 | Not film-forming | | |
| VI | 2/1 | Morpholine, 1 | 2-methylpiperazine, 2 | 315 | 380 | 108 |
| VII | 2/1 | 5 Mole ethylene oxide adduct of octylphenol, 0.5 | 2-methylpiperazine, 2.5 | 411 | 280 | 129 |
| VIII | 2/1 | 1,1,1-Trichloroisopropanol,[1] 1.0 | 2-methylpiperazine, 2.0 | 233 | 380 | 132 |
| IX | 2/1 | $CF_2H-(CF_2)_6-CH_2OH$,[1] 1.0 | 2-methylpiperazine, 2.0 | 220 | 360 | 125 |

[1] This component was added to the polyol prior to the preparation of the NCO-terminated prepolymer.

TABLE 3.—3030 MOL. WT. (1010 EQUIVALENT WT.) POLYOL PREPARED FROM PROPYLENE OXIDE AND GLYCEROL

| Example | NCO/OH ratio | Chain extender | | Film properties | | |
|---|---|---|---|---|---|---|
| | | A. Equiv. | B. Equiv. | Modulus, 100% | Elongation, percent | Wt. percent perchloroethylene swell |
| X | 2/1 | | 2-methylpiperazine, 3 | Not film-forming | | |
| XI | 2/1 | Morpholine, 1 | 2-methylpiperazine, 2 | 128 | 560 | 254 |
| XII | 2/1 | Morpholine, 1 | Cyclohexane bis-(methylamine), 2 | 230 | 430 | 143 |

EXAMPLE XIII (A) Prepolymer preparation

A blend comprising 11,812 parts of a 2953 molecular weight triol (984 equivalent weight) prepared from propylene oxide and glycerol and 5328 parts of a 666 molecular weight (333 equivalent weight) diol prepared from propylene oxide and Bisphenol A was charged to a reaction vessel along with 8805 parts of toluene and 856 parts of the five mole propylene oxide adduct of octylphenol. The charge was stirred and 4872 parts of tolylene diisocyanate was added. Stirring continued for about four hours at 80° C. to 90° C. After cooling, the free NCO content was 3.53%.

(B) Chain extension

To 1727 parts of the prepolymer prepared above was added 36 parts of a surfactant consisting of dihydric polyoxyethylene polyoxypropylene having a molecular weight of about 16,000, a polyoxyethylene content of about 80% by weight and a molecular weight of the polyoxypropylene base of about 3250 dissolved in 840 parts of H₂O. The aqueous surfactant solution was cooled prior to its addition to the prepolymer solution. A solution of 57 parts of 2-methylpiperazine in 400 parts of water was added to the emulsified prepolymer with good agitation. A stable suspension resulted which, when cast, produced a film with outstanding mechanical strength properties. Some of these properties include:

| | |
|---|---|
| Tensile strength, p.s.i. | 2644 |
| 100% modulus, p.s.i. | 650 |
| Elongation, percent | 300 |
| Hardness Shore A | 76 |
| Percholoroethylene swell, wt. percent | 165 |

EXAMPLE XIV

The procedure of Example XIII was followed with the single exception that 9.6 parts of morpholine was added along with 57.2 parts of 2-methylpiperazine in lieu of adding ethoxylated octylphenol to the diol-triol blend. Physical properties of the film cast from the latex are as follows:

| | |
|---|---|
| Tensile Strength, p.s.i. | 1865 |
| 100% modulus, p.s.i. | 553 |
| Elongation, percent | 450 |
| Hardness Shore A | 74 |
| Percholoroethylene swell, wt. percent | 238 |

EXAMPLE XV

The procedure of Example XIV is followed with the single exception that 7001 parts of 4,4'-methylene bis (phenylisocyanate) is substituted for tolylene diisocyanate. A stable latex resulted which, when cast, formed a film having mechanical strength properties comparable to the film prepared in Example XIV.

EXAMPLE XVI

The procedure of Example XIII is followed with the single exception that 49 parts of piperazine is substituted for 2-methylpiperazine. A film having outstanding mechanical strength properties is prepared.

EXAMPLE XVII

The procedure of Example XIII was followed with the single exception that 51.3 parts of 1,4-butanediol was substituted for 2-methylpiperazine. A film with lower mechanical strength properties but higher resilience was obtained.

EXAMPLE XVIII

The procedure of Example I is followed employing:

5580 parts of a 5580 molecular weight (1395 equivalent wt.) tetrol prepared from a mixture of ethylene oxide and butylene oxide and pentaerythritol,
696 parts of tolylene diisocyanate,
174 parts of morpholine, and
100 parts of 2-methylpiperazine.

EXAMPLE XIX

The polyurethane latex of Example XIV was employed in a paper-making system in the following manner:

A bleached kraft pulp used for saturating was made into handsheets on the standard TAPPI British sheet machine. The sheets were four grams in weight. After the sheets were dried, they were saturated for ten minutes with the latex, which had been reduced to 25% solids with water. The sheets were then cured for fifteen minutes at 150° C. and the following physicals tested:

| | Control | Latex |
|---|---|---|
| Mullen | 14.4 | 26.8 |
| Tear | 144.1 | 89.3 |
| Tensile, lb./in | 22.2 | 62.0 |
| MIT fold No. of cycles | 11 | 2,618 |
| Percent abrasion loss, 1,000 cycles | (¹) | 1.5 |

¹ Failed at 100 cycles.

The control was a handsheet which had not been saturated with a polyurethane latex.

What is claimed is:
1. Film-forming polyurethane latices obtained by the chain extension of an NCO-terminated prepolymer prepared by the reaction of an organic diisocyanate with a polyalkylene ether polyol having a functionality greater than two and an equivalent weight between 500 and 2500 said polyol prepared from an alkylene oxide having at least 3 carbon atoms or a mixture of alkylene oxides containing at least 50% by weight of an alkylene oxide having at least 3 carbon atoms with a mixture of an organic compound having one active hydrogen atom and an organic compound having at least two active hydrogen atoms, said mixture comprising from 0.05 to 0.5 equivalent per equivalent of isocyanate of an organic compound having one active hydrogen atom.

2. The latices of claim 1 when the organic diisocyanate is tolylene diisocyanate.

3. The latices of claim 1 when the polyalkylene ether polyol is prepared from propylene oxide and a trihydric alcohol.

4. The latices of claim 1 when the organic compound having one active hydrogen atom is morpholine.

5. The latices of claim 1 when the organic compound having one active hydrogen atom is ethoxylated octylphenol.

6. The latices of claim 1 when the organic compound having at least two active hydrogen atoms is 2-methylpiperazine.

7. The latices of claim 1 when the organic compound having one active hydrogen atom is morpholine and the compound having at least two active hydrogen atoms is 2-methylpiperazine.

8. A process of preparing film-forming polyurethane latices which comprises chain extending an NCO-terminated prepolymer prepared by the reaction of an organic diisocyanate with a polyalkylene ether polyol having a functionality greater than two and an equivalent weight between 500 and 2500 said polyol prepared from an alkylene oxide having at least 3 carbon atoms or a mixture of alkylene oxides containing at least 50% by weight of an alkylene oxide having at least 3 carbon atoms with a mixture of an organic compound having one active hydrogen atom and an organic compound having at least two active hydrogen atoms, said mixture comprising from 0.05 to 0.5 equivalent per equivalent of isocyanate of an organic compound having one active hydrogen atom.

9. The process of claim 8 when the organic diisocyanate is tolylene diisocyanate.

10. The process of claim 8 when the polyalkylene ether polyol is prepared from propylene oxide and a trihydric alcohol.

11. The process of claim 8 when the organic compound having one active hydrogen atom is morpholine.

12. The process of claim 8 when the organic compound having one active hydrogen atom is ethoxylated octylphenol.

13. The process of claim 8 when the organic compound having at least two active hydrogen atoms is 2-methylpiperazine.

14. The process of claim 8 when the organic compound having one active hydrogen atom is morpholine and the compound having at least two active hydrogen atoms is 2-methylpiperazine.

References Cited

UNITED STATES PATENTS

| | | | |
|---|---|---|---|
| 2,968,575 | 1/1961 | Mallonee | 260—29.2 |
| 3,213,049 | 10/1965 | Heiss | 260—29.2 |
| 3,294,724 | 12/1966 | Axelrood | 260—29.2 |
| 3,350,361 | 10/1967 | Chandley et al. | 260—77.5 |

MURRAY TILLMAN, *Primary Examiner.*

JOHN C. BLEUTGE, *Assistant Examiner.*